Figure 1:
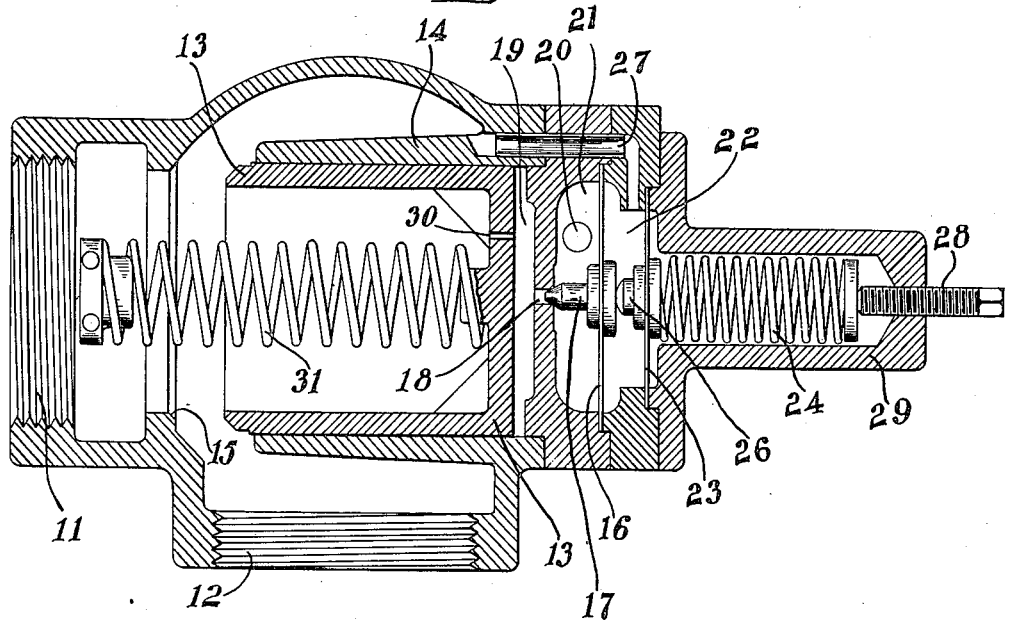

W. RAYMOND.
REGULATOR FOR COMPRESSORS.
APPLICATION FILED NOV. 24, 1920.

1,402,016.

Patented Jan. 3, 1922.

INVENTOR
Ward Raymond
BY Joseph N. Schofield
ATTORNEY

UNITED STATES PATENT OFFICE.

WARD RAYMOND, OF EASTON, PENNSYLVANIA, ASSIGNOR TO PENNSYLVANIA PUMP AND COMPRESSOR CO., OF EASTON, PENNSYLVANIA, A CORPORATION OF PENNSYLVANIA.

REGULATOR FOR COMPRESSORS.

1,402,016.  Specification of Letters Patent.  Patented Jan. 3, 1922.

Application filed November 24, 1920. Serial No. 426,112.

*To all whom it may concern:*

Be it known that I, WARD RAYMOND, a citizen of the United States, residing in Easton, in the county of Northampton and State of Pennsylvania, have invented certain new and useful Improvements in a Regulator for Compressors, of which the following is a specification.

This invention relates to regulators for compressors and in particular to a regulator of the inlet type which is adapted to close the inlet to a compressor cylinder when the discharge pressure reaches a predetermined amount.

The object of the present invention is to provide a regulator of the above type which may be accurately adjusted and which will be sensitive so that the discharge pressure of the compressor may be kept within very close limits.

A further object of the invention is to provide the regulator with a pressure operated device which will cause the valve within the regulator body to close positively as soon as the discharge pressure of the compressor reaches a predetermined limit and, as soon as the valve has closed, it will be held positively in that position until the pressure has dropped a predetermined amount.

A further object of the invention is to utilize the vacuum formed within the inlet of the compressor when the regulator valve closes to aid in holding the regulator valve closed until the pressure has dropped to the predetermined amount.

In addition to the above objects, an advantage of the present invention is that the adjusting means for the regulator comprises a compressive spring which may be readily adjusted from the outside of the regulator body by simply varying the pressure on the spring.

I also obtain advantages which will be apparent as the specification proceeds by reason of the two diaphragms, one of which mounts the pilot or needle valve the opening of which forces pressure into the regulator chamber to close the valve.

With these and other objects in view my invention consists in the features of construction and operation set forth in the following specification and illustrated in the accompanying drawings.

Figure 2:
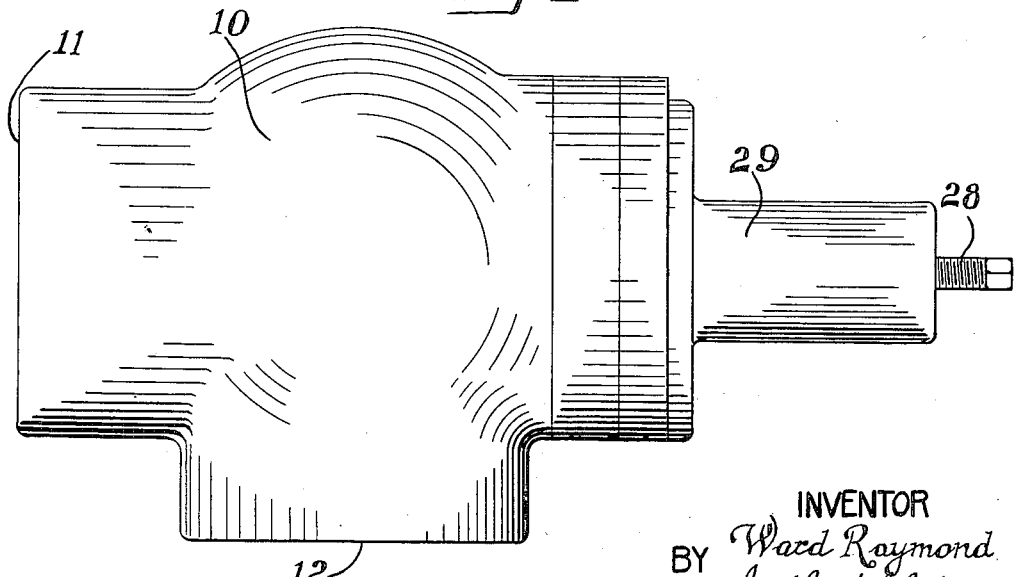

In the drawing:

Figure 1 is a cross sectional view taken directly through the entire regulator, and Fig. 2 is an outside view of the same.

In the present drawing and description, I have selected one embodiment of the invention which I now deem preferable but it is to be understood that other forms or embodiments of the invention may be devised without departing from the spirit of the invention, and that the present drawing and description are not to be taken as limiting the invention, the claims appended to this specification being relied upon for that purpose. For example, where I have shown and described diaphragms 16 and 23, it will be understood that pistons of suitable sizes sliding in proper cylinders might be substituted without departing from the spirit of the invention.

In its broadest aspect my invention comprises the following principal parts: namely, first, a body member, second a valve therein adapted to be moved from open to closed position by fluid pressure; third, a spring normally holding said valve in its open position; fourth, a pilot valve to admit pressure against the regulator valve to force it to its closed position; fifth, a diaphragm on which said pilot valve is mounted; sixth, a second diaphragm of smaller area than the first and adjacent said first diaphragm; seventh, an adjustable spring pressing against both of said diaphragms and normally closing said pilot valve, and eighth; a conduit from the space between the diaphragms to the compressor inlet part of the body member.

Referring more in detail to the drawing, at 10 is shown a body member having a connection 11 to atmosphere, and, at 12 an inlet to a compressor cylinder.

At 13 is shown a valve slidably mounted within a cylinder 14 formed within the body member 10. In its closed position, the valve presses against the valve seat 15.

In a separate chamber 21 formed in the body member 10 is a diaphragm 16 in which a needle valve 17 is inserted at its central point. The valve 17 is normally pressed against a small seat formed in the body member so that movement of the valve 17 opens and closes a port 18 leading into the chamber 19 formed by cylinder 14 and immediately behind the valve 13.

A conduit extending from the discharge passage or receiver of the compressor to which the regulator is mounted has a port 20 opening into the chamber 21. As soon as the pressure within the receiver of the compressor reaches a predetermined amount, the diaphragm 16 is forced backward thus opening the port 18 and allowing the fluid under pressure to enter the cylinder 14 to close the valve 13 against its seat 15.

Behind the diaphragm 16 in a separate chamber 22 is a second diaphragm 23 normally forced against the diaphragm 16 by spring 24. Preferably, I mount a support 26 on the diaphragm 23 to hold the diaphragm 23 in the position as shown in Fig. 1. Between the chamber 22 and the intake portion of the regulator body 10 is a conduit 27 so that the pressure within chamber 22 is equal at all times to the pressure within intake 12.

A screw 28 threaded into the end of an extension 29 serves to regulate the pressure of the spring 24 against the diaphragm 23 and thus against the diaphragm 16 to force the valve 17 toward its closed position.

Suitable fastening means, not shown, are provided to hold all parts of the regulator body 10 together and to maintain fluid tight joints between the parts of the regulator body 10 and the diaphragms 16 and 23.

Extending through the valve 13 is a small leak port 30 to permit pressure within chamber 19 to be exhausted when the needle valve 17 seats and closes port 18. This allows the valve 13 to open again under the pressure of spring 31 mounted, as shown, within the body of the regulator 10.

The operation of the regulator is as follows: As soon as the pressure within the receiver supplied by the compressor is sufficient to force the diaphragm 16 backward against the force of spring 24, fluid enters chamber 19 thus forcing the valve 13 toward its closed position. As this movement takes place, continued operation of the compressor exhausts the fluid from the intake 12 and from the body of the regulator forming a partial vacuum. This vacuum, by means of conduit 27 operates within the chamber 22 and forces the diaphragm still farther back thus opening the pilot valve 17 still farther, and supplying more air to chamber 19. This additional pressure forces the valve 13 quickly to its seat and holds it there firmly.

The amount of this force supplementing the receiver pressure within chamber 21 is dependent upon the difference in area of the diaphragms 16 and 23 and the vacuum within the intake 12. This vacuum within the inlet 12 and chamber 22 may amount to a complete atmosphere, that is, the pressure within the chamber 22 may be completely exhausted. This increases the pressure difference on the sides of the diaphragm 16 thus supplementing the pressure within chamber 21 to hold the valve 17 open.

As soon as the receiver pressure within chamber 21 has dropped a predetermined amount so that the pressure within the chamber 21 aided by the added pressure difference caused by the vacuum within chamber 22 is insufficient to hold the valve 17 open against spring 24, the valve 17 closes. The fluid within chamber 19 will then be exhausted through the leak port 30 thus allowing the valve 13 to open.

By making the diaphragms 16 and 23 of suitable diameters, the difference in area may be varied so that any desirable working range for the regulator may be provided. The more closely the diaphragms 16 and 23 are to the same area, the closer the working range of the regulator will be, and vice versa. This is for the reason that the valve 17 cannot close until the pressure within the chamber 21 has dropped sufficiently to compensate for the vacuum within chamber 22 also operating to hold the valve 17 open. This added pressure difference on the sides of the diaphragm 16 is sufficient to prevent fluttering of the valve 13 and serves to hold it either in its wide open or closed position.

From the above description, it will be seen that I have provided supplemental means comprising a vacuum chamber to aid in holding the valve 17 open. This vacuum is produced by the action of the compressor and exists as soon as the valve 13 is closed sufficiently to throttle the ingoing air to any appreciable extent. This vacuum increases the difference of pressure on either side of the diaphragm 16 and acts as long as the valve 13 remains closed.

By choosing proper effective areas for the diaphragms 16 and 23, this difference of pressure may be controlled, and so the working range of the regulator may be accurately set and maintained constant.

The pressure at which the valve 17 is opened may be accurately adjusted by means of the adjusting screw 28 but the working range or pressure drop necessary to reopen the valve 17 is not affected by adjustment of the spring 24 but only by the difference in areas of diaphragms 16 and 23.

I claim:

1. A regulator for compressors comprising in combination, a body member, a valve therein adapted to open and close the inlet to a compressor cylinder, means normally holding said valve in its open position, pressure operated means to close said valve, said means comprising a diaphragm, a pressure conduit having a port below said diaphragm and a conduit extending from the area behind said diaphragm to said compressor inlet.

2. A regulator for compressors comprising in combination, a body member, a valve therein adapted to open and close the inlet to a compressor cylinder, means normally holding said valve in its open position, pressure operated means to close said valve, said means comprising a diaphragm, a second diaphragm behind said first diaphragm, and a conduit extending from the area separating said diaphragms to the inlet.

3. A regulator for compressors comprising in combination, a body member, a valve therein adapted to open and close the inlet to a compressor cylinder, means normally holding said valve in its open position, pressure operated means to close said valve, said means comprising a diaphragm, a second diaphragm of smaller area behind said first diaphragm, and a conduit extending from the area separating said diaphragms to the inlet.

4. A regulator for compressors comprising in combination, a body member, a valve therein adapted to open and close the inlet to a compressor cylinder, means normally holding said valve in its open position, pressure operated means to close said valve, said means comprising a diaphragm, a second diaphragm behind said first diaphragm, a conduit extending from the area separating said diaphragms to the inlet, and regulating means behind said second diaphragm.

5. A regulator for compressors comprising in combination, a body member, a valve therein adapted to open and close the inlet to a compressor cylinder, means normally holding said valve in its open position, pressure operated means to close said valve, said means comprising a diaphragm, a second diaphragm behind said first diaphragm, a conduit extending from the area separating said diaphragms to the inlet, a spring pressing against said second diaphragm, and means to adjust the pressure of said spring.

6. A regulator for compressors comprising in combination, a body member, a valve therein adapted to open and close the inlet to a compressor cylinder, means normally holding said valve in its open position, pressure operated means to close said valve, said means comprising a diaphragm, and a conduit extending from the area behind said diaphragm to said compressor inlet whereby the pressure difference on opposite sides of said diaphragm is increased when the valve is closed.

In testimony whereof, I have hereunto set my hand.

WARD RAYMOND.